(12) United States Patent
Bonner

(10) Patent No.: US 7,367,620 B1
(45) Date of Patent: May 6, 2008

(54) BICYCLE SEAT AND ASSOCIATED METHODS

(75) Inventor: Ronnie J. Bonner, Maitland, FL (US)

(73) Assignee: American Mentality, Inc., Longwood, FL (US)

( * ) Notice: Subject to any disclaimer, the term of this patent is extended or adjusted under 35 U.S.C. 154(b) by 0 days.

(21) Appl. No.: 11/675,285

(22) Filed: Feb. 15, 2007

(51) Int. Cl.
*B60N 2/38* (2006.01)

(52) U.S. Cl. ............... 297/195.1; 297/215.16; 297/215.14; 297/214; 297/204; 297/196; 297/195.13

(58) Field of Classification Search ......... 297/195.1, 297/215.16, 215.14, 215.13, 214, 204, 203, 297/196, 195.13, DIG. 9
See application file for complete search history.

(56) References Cited

U.S. PATENT DOCUMENTS

| | | | | |
|---|---|---|---|---|
| 4,367,896 A | * | 1/1983 | Nieddu | 297/195.1 |
| 4,909,522 A | * | 3/1990 | Flanigan | 297/215.1 |
| 5,765,912 A | * | 6/1998 | Bontrager | 297/214 |
| 5,791,730 A | * | 8/1998 | Hoffacker | 297/195.1 |
| 5,927,802 A | * | 7/1999 | Kesinger | 297/204 |
| 6,322,139 B1 | * | 11/2001 | Chuang | 297/195.1 |
| 6,561,578 B1 | * | 5/2003 | Mel | 297/195.1 |

* cited by examiner

*Primary Examiner*—Laurie K. Cranmer
(74) *Attorney, Agent, or Firm*—Allen, Dyer, Doppelt, Milbrath & Gilchrist, P.A.

(57) ABSTRACT

A bicycle seat and a method of attaching same to a bicycle frame are provided wherein the seat includes an elongated, rounded triangular-shaped element having an upper face adapted for receiving a rider. The seat's underside has at least a portion that comprises a depression, and is surrounded by a lower edge. Depending from the underside adjacent a front and rear thereof are elements for affixing front and rear ends of seat rails thereto. The seat rails are recessed into the seat's underside depression, and do not protrude beneath the seat's lower edge. The seat is attached to the bicycle frame using a single-bolt post, by snapping the rails into the post's apertures, adjusting the seat along a longitudinal axis until a desired position is achieved, and tightening the post's bolt.

8 Claims, 1 Drawing Sheet

U.S. Patent  May 6, 2008  US 7,367,620 B1
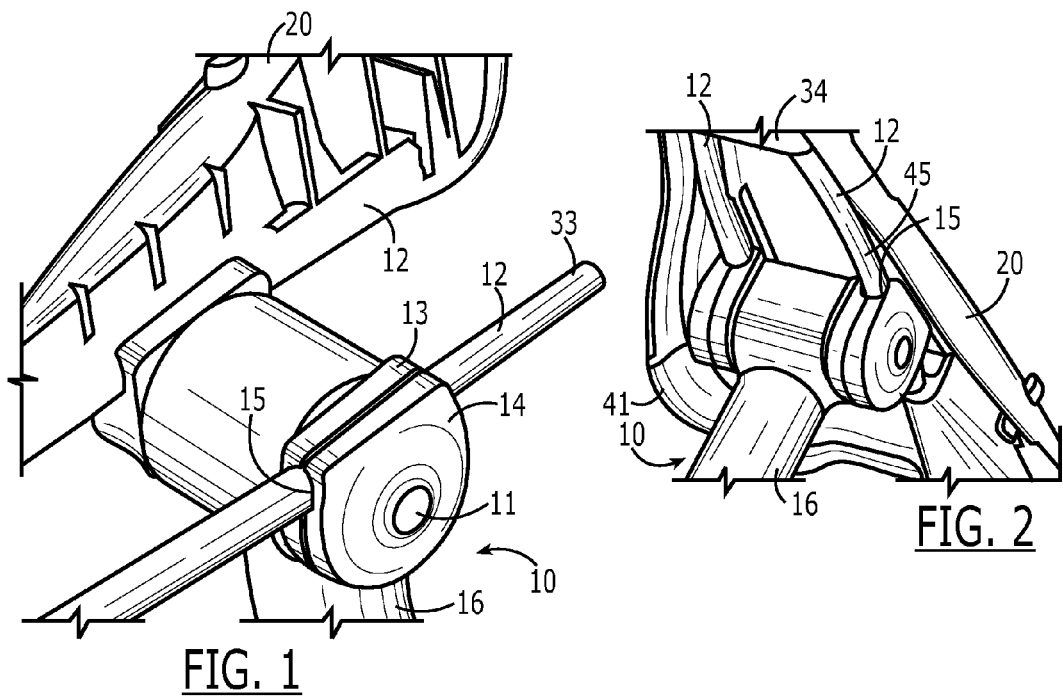
FIG. 1
FIG. 2
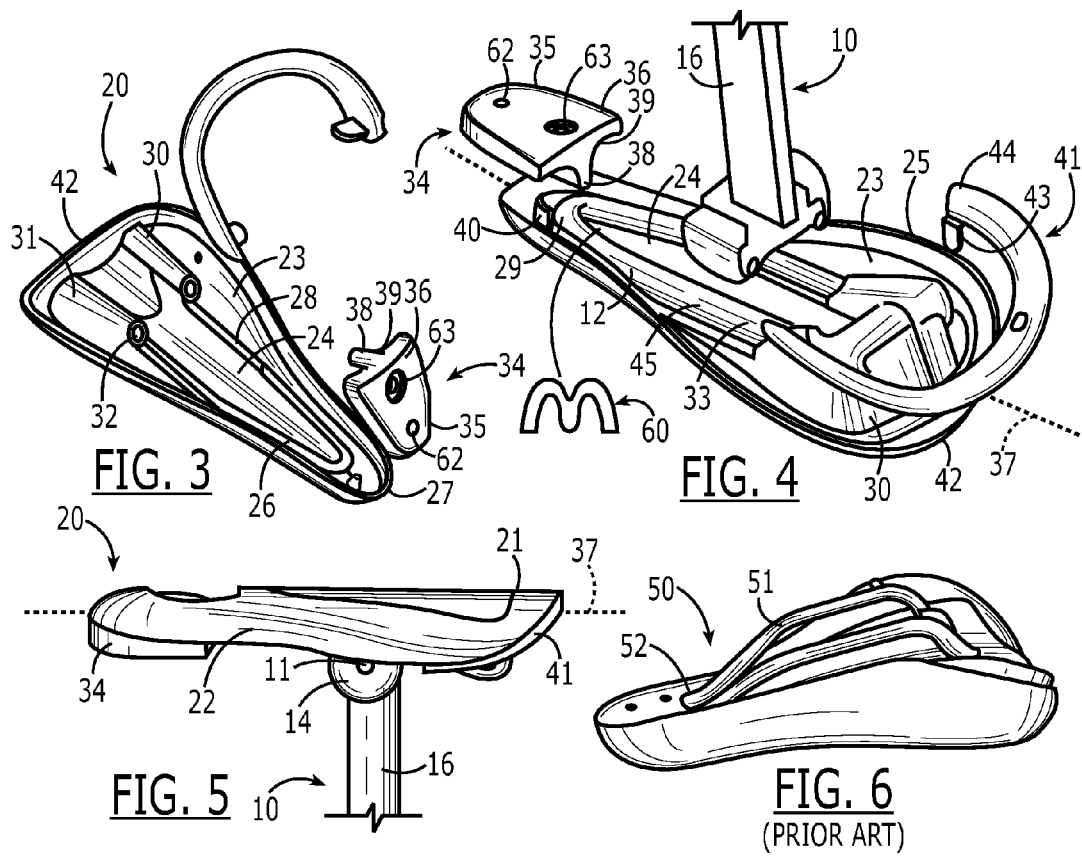
FIG. 3
FIG. 4
FIG. 5
FIG. 6
(PRIOR ART)

BICYCLE SEAT AND ASSOCIATED METHODS

BACKGROUND OF THE INVENTION

1. Field of the Invention

The present invention relates to bicycle seats, and, more particularly, to an attachment system and method for attaching bicycle seat to a post.

2. Description of Related Art

It is known to attach bicycle seats 50 to posts with the use of a pair of parallel rails 51 that protrude beneath the bottom edge 52 of the seat 50 (see FIG. 6). Bolts are used to attach the seat post to the rails, and the seat can be adjusted forward and backward depending upon the preference of the rider. This configuration, however, leaves the rails vulnerable to bending.

It is also known to provide a single-bolt attachment between a seat and post wherein the bolt is inserted along the post's longitudinal axis. This configuration can lead to bowing, and only provides for a single forward/backward attachment configuration for the rider.

A new type of post 10 has been introduced into the field that permits assembly with the use of a single bolt 11 (FIG. 1). The post 10 comprises a T-shaped device that can be affixed to a pair of substantially parallel seat rail elements 12 with a single bolt 11, and includes a pair of spaced-apart spring-loaded opposed inner 13 and outer plates 14 that comprise the cross-piece of the "T." The plates' inner surfaces define a substantially cylindrical aperture 15 dimensioned for admitting a seat rail 12. The arm of the "T" comprises a rod 16 for being affixed to the bicycle body. Typically the seat rail 12 comprises a strong material such as aluminum.

SUMMARY OF THE INVENTION

The present invention is directed to a bicycle seat and a method of attaching same to a bicycle frame. The seat comprises an elongated, rounded triangular-shaped element having an upper face adapted for receiving a rider. The seat's underside has at least a portion that comprises a depression, and is surrounded by a lower edge. Depending from the underside adjacent a front and rear thereof are means for affixing front and rear ends of seat rails thereto.

An important development inherent in the present invention is the positioning of the seat rails, which are recessed into the seat's underside depression, and do not protrude beneath the seat's lower edge. This positioning has been found to minimize the potential for bending, and permits the entire assembly to be lighter.

The seat is attached to the bicycle frame using the previously discussed post, by snapping the rails into the post's apertures, adjusting the seat along a longitudinal axis (forward/backward) until a desired position is achieved, and tightening the post's bolt.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a cutaway view of the seat rails affixed in the post apertures.

FIG. 2 is an underside view of the seat and post attachment.

FIG. 3 is an underside view of the main body of the seat.

FIG. 4 is an exploded view of the seat elements.

FIG. 5 is a side perspective view of the assembled seat and post.

FIG. 6 (prior art) is a side perspective view of a prior art bicycle seat.

DETAILED DESCRIPTION OF THE PREFERRED EMBODIMENTS

A description of the preferred embodiments of the present invention will now be presented with reference to FIGS. 1-5.

The present invention is directed to a bicycle seat 20 and a method of attaching same to a bicycle frame. The seat 20 (FIG. 3) comprises an elongated, rounded triangular-shaped element that can comprise, for example, a molded plastic, although this is not intended as a limitation. The seat 20 has an upper face 21 (FIG. 5) that is adapted for receiving a rider, and curves downward laterally toward the sides 22.

The seat's underside 23 has at least a portion that comprises a depression 24 (FIG. 3), and is surrounded by a lower edge 25 that extends completely around the seat's underside 23. The underside 23 has molded portions for supporting the seat rails 12. In particular, the seat rails 12 comprise a single element formed into a substantial "V" shape. The seat rail element 12 is supported by a molded portion that comprises, for example, a "V"-shaped nest 26 extending from the front 27 of the seat 20 and having a lower depression 28 dimensioned for accepting the rail element 12. The notch 29 of the "V" is positioned adjacent the seat's front 27. Another molded portion comprises a rail receptacle 30 that includes a pair of spaced-apart cylindrical elements 31, each having an open end 32 dimensioned for receiving a rear end section 33 of the seat rail element 12.

Another support piece affixable to the seat underside 23 comprises a substantially "M"-shaped brace 60 that is dimensioned for positioning atop the nest 26 and is shaped to cover a front portion of the seat rail element 12 adjacent the notch 29.

A front rail support 34 has a front and side contour 35 substantially commensurate with that of the seat's front 27 and a rear contour 36 that is substantially straight and perpendicular to the seat's longitudinal axis 37 (FIGS. 3 and 4). The front rail support 34, which can comprise, for example, molded plastic, has a lower surface shaped to conform to the notch 29 and the brace 60, with a central deep section 38 for fitting in the notch 29 and a pair of opposed cutouts 39 for cradling the lower and innerfaces of the notch 29 and the upper face of the brace 60. The front rail support 34 is affixable to the seat underside 23 by a pair of bolts extending through bolt hole 62 into a bolt receptacle 40 molded into the seat 20 and through bolt hole 63 inside the notch 29.

The seat rails 12 are positionable in the seat depression 24 in such a way that they are recessed so as not to protrude beneath the seat's lower edge 25 (FIG. 5). As mentioned above, this positioning has been found to minimize the potential for bending, and permits the entire assembly to be lighter.

A further piece affixable to the seat underside 23 is a rear protective element 41 having an arcuate shape and formed to conform with the rear 42 of the seat 20 (FIGS. 3 and 4). The rear protective element 41, which can comprise, for example, molded plastic, is affixable via bolts to the seat underside 23 at attachment points 43 at front ends 44 of the rear protective element 41.

The seat 20 can be attached to a bicycle frame using the previously discussed post 10 (FIGS. 1 and 2), by snapping a central portion 45 of each of the rails 12 between the notch 29 and the rear end sections 33 into the post's apertures 15. The seat's position relative to the post 10 can be adjusted along the longitudinal axis 37 (forward/backward) until a desired position is achieved, and tightening the post's bolt.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A bicycle seat comprising:
   a seat rail comprising a cylindrical member formed into a substantially "V" shape having a notch at a front end and two rail elements extending rearward therefrom toward rear ends thereof, rear portions of the rail elements substantially parallel; and
   a base having an approximately rounded triangular shape, an upper face thererof adapted for receiving a rider, a lower face thereof having a depression therein surrounded by a base lower edge, a front attachment element adjacent a front end thereof having means for affixing the seat rail adjacent the notch thereto, the front attachment element comprising a substantially "V"-shaped nest positioned and dimensioned to receive the seat rail notch and a front rail support comprising a plate affixable to sandwich the seat rail notch between the nest and the front rail support, the front attachment element further comprising a substantially "M"-shaped brace dimensioned for positioning between the nest and the plate, and shaped to cover a front portion of the seat rail adjacent the notch, and a rail receptacle adjacent a rear end thereof having apertures therein facing forward and dimensioned and positioned for receiving rear portions of the rail elements thereinto, the front attachment element and the rail receptacle positioned relative to the base lower edge that the seat rail is housed completely within the base depression.

2. The bicycle seat recited in claim 1, wherein the seat rail comprises aluminum.

3. The bicycle seat recited in claim 1, wherein the base comprises a molded plastic.

4. The bicycle seat recited in claim 1, wherein the plate has a lower surface shaped to generally conform to the seat rail front portion and the brace.

5. The bicycle seat recited in claim 1, wherein the rail receptacle comprises a pair of spaced-apart generally cylindrical elements.

6. The bicycle seat recited in claim 1, further comprising a rear protective element affixable to base lower face adjacent the lower edge adjacent the rear end, the rear protective element having an arcuate shape conforming with the lower edge adjacent the rear end.

7. A method of making a bicycle seat comprising the steps of:
   forming a cylindrical member into a seat rail having a substantially "V" shape having a notch at a front end and two rail elements extending rearward therefrom toward rear ends thereof, rear portions of the rail elements substantially parallel;
   forming a base having an approximately rounded triangular shape, an upper face thereof adapted for receiving a rider, a lower face thereof having a depression therein surrounded by a base lower edge;
   positioning the seat rail within the base depression;
   affixing the seat rail adjacent the notch to a front end of the base, by positioning the seat rail notch within a substantially "V"-shaped nest and placing a front rail support plate over the notch to sandwich the seat rail notch between the nest and the front rail support, and by positioning a substantially "M"-shaped brace between the nest and the plate in covering relation to a front portion of the seat rail adjacent the notch; and
   affixing the seat rail adjacent rear portions thereof adjacent a rear end of the base.

8. The method recited in claim 7, wherein the step of affixing the seat rail adjacent rear portions thereof comprises inserting rear portions of the rail element into open ends of a pair of spaced-apart generally cylindrical elements.

* * * * *